US012647731B2

(12) United States Patent
Rusconi Clerici Beltrami et al.

(10) Patent No.: US 12,647,731 B2
(45) Date of Patent: Jun. 2, 2026

(54) SOUND TRANSDUCER UNIT

(71) Applicant: USound GmbH, Graz (AT)

(72) Inventors: Andrea Rusconi Clerici Beltrami, Vienna (AT); Ferruccio Bottoni, Graz (AT); Samu Bence Horváth, Vienna (AT); Christian Novotny, Vienna (AT); Jakob Spoetl, Vienna (AT)

(73) Assignee: USound GmbH, Graz (AT)

( * ) Notice: Subject to any disclaimer, the term of this patent is extended or adjusted under 35 U.S.C. 154(b) by 215 days.

(21) Appl. No.: 18/439,146

(22) Filed: Feb. 12, 2024

(65) Prior Publication Data

US 2024/0276152 A1 Aug. 15, 2024

(30) Foreign Application Priority Data

Feb. 13, 2023 (DE) ..................... 10 2023 103 447.2
May 5, 2023 (DE) ..................... 10 2023 111 766.1

(51) Int. Cl.

| | |
|---|---|
| ***H04R 9/02*** | (2006.01) |
| ***H04R 7/04*** | (2006.01) |
| ***H04R 9/04*** | (2006.01) |
| ***H04R 9/06*** | (2006.01) |

(52) U.S. Cl.

CPC ............... *H04R 9/025* (2013.01); *H04R 7/04* (2013.01); *H04R 9/047* (2013.01); *H04R 9/063* (2013.01)

(58) Field of Classification Search

CPC ........ H04R 9/025; H04R 9/047; H04R 9/063; H04R 7/04; H04R 2209/00; H04R 2207/00

See application file for complete search history.

(56) References Cited

U.S. PATENT DOCUMENTS

| | | | | |
|---|---|---|---|---|
| 3,939,312 | A | 2/1976 | McKay | |
| 4,008,374 | A | 2/1977 | Tiefenbrun | |
| 4,242,541 | A * | 12/1980 | Ando | H04R 17/005 381/99 |
| 2012/0070022 | A1 | 3/2012 | Saiki | |
| 2015/0110339 | A1 | 4/2015 | Colich | |
| 2017/0325025 | A1 * | 11/2017 | Dorfmeister | H04R 17/00 |
| 2018/0206029 | A1 * | 7/2018 | Colich | H04R 3/00 |

FOREIGN PATENT DOCUMENTS

| | | |
|---|---|---|
| DE | 102007016582 B3 | 6/2008 |
| EP | 1679936 | 7/2006 |

OTHER PUBLICATIONS

German Search Report for corresponding Application No. 10 2023 111 766.1, dated Jan. 25, 2024, 9 pages.

European Search Report for corresponding Application No. EP 24 15 6741, dated Jun. 13, 2024, 8 pages.

* cited by examiner

*Primary Examiner* — Sunita Joshi

(74) *Attorney, Agent, or Firm* — Dority & Manning, P.A.

(57) ABSTRACT

In one aspect, a sound transducer unit includes at least two magnet units having a permanent magnetic field and further includes at least two acoustic units. Each acoustic unit has a diaphragm that is deflectable along a stroke axis for generating sound waves. The sound transducer unit also includes a coil arrangement provided in association with each acoustic unit, wherein the coil arrangement is configured to be supplied electric current such that the diaphragm is deflectable along the stroke axis. The at least two magnet units and the at least two acoustic units are arranged alternatively one above the other.

20 Claims, 6 Drawing Sheets

SOUND TRANSDUCER UNIT

CROSS-REFERENCE TO RELATED APPLICATIONS

The present application is based upon and claims the right of priority to German Patent Application No. 10 2023 103 447.2, filed Feb. 13, 2023, and German Patent Application No. 10 2023 111 766.1, filed May 5, 2023, the disclosures of which are hereby incorporated by reference herein in their entirety for all purposes.

FIELD OF THE INVENTION

The present subject matter relates generally to a sound transducer unit, and, in particular, a flat panel speaker, preferably a magnetostatic loudspeaker, having improved performance.

BACKGROUND OF THE INVENTION

EP 3 855 762 A1 describes a sound transducer unit having magnet units and acoustic units. However, a sound transducer unit having improved operating performance, such as improved power, would be welcomed in the technology.

BRIEF SUMMARY OF THE INVENTION

In various aspects, the present subject matter is directed to a sound transducer unit having improved power. In accordance with aspects of the present subject matter, this is achieved by means of a sound transducer unit, a method for operating the sound transducer unit, an acoustic unit and a magnet unit, and their uses having the features of the described and claimed herein.

In one aspect, the present subject matter relates to a sound transducer unit having at least one magnet unit, which has a permanent magnetic field. The sound transducer unit can be a flat panel speaker. In one embodiment, the sound transducer unit can be a loudspeaker unit.

Furthermore, the sound transducer unit has at least one acoustic unit, which includes at least one diaphragm that is deflectable along a stroke axis for generating sound waves, and a coil arrangement. An electric current can be applied to the coil arrangement such that the diaphragm is deflectable along the stroke axis. Since the acoustic unit is arranged in the permanent magnetic field, the electric current also flows in the permanent magnetic field. As a result, the Lorentz force is formed such that the diaphragm can be deflected, thereby allowing for sound waves to be generated.

The coil arrangement can also form a dynamic magnetic field by means of an electrical signal, which forms the electric current, with the acoustic unit being coupled to the magnet unit via the two magnetic fields such that the diaphragm is deflectable along the stroke axis. A magnetic coupling therefore exists between the magnet unit and the acoustic unit. The electrical signals generate an electric current in the coil arrangement, with the electric current in turn generating the dynamic magnetic field. The dynamic magnetic field interacts with the permanent magnetic field and, as a result, the diaphragm is deflected such that sound waves are generated and emitted.

Furthermore, the sound transducer unit includes at least two magnet units and at least two acoustic units. The magnet units and the acoustic units can be identical to one another. In particular, the magnet units each have a permanent magnetic field. The permanent magnetic fields of the at least two magnet units together form an overall magnetic field. Moreover, the acoustic units each have a diaphragm and a coil arrangement. The electrical signal and/or the electric current are/is supplied to the respective coil arrangements such that the respective diaphragms can be deflected in the respective permanent magnetic fields or in the overall magnetic field. The respective diaphragms are deflected by magnetic forces, in particular by the interaction between the permanent magnetic fields or the overall magnetic field and the respective dynamic magnetic fields of the particular coil arrangements. Furthermore, the electric currents in the permanent magnetic fields or in the overall magnetic field can induce the Lorentz force such that the respective diaphragms are deflected.

In addition, at least the at least two magnet units and the at least two acoustic units are arranged alternatingly one above the other. As a result, sound pressure and/or acoustic energy is increased, since each acoustic unit generates sound. Due to the alternating arrangement of the magnet units and acoustic units, the diaphragms can be actuated independently of one another. Moreover, due to the alternating arrangement, one magnet unit is associated with each acoustic unit such that the diaphragms can be deflected identically to one another. The diaphragms generate the same sound with respect to one another, as a result of which the sound quality is improved. The magnet units and the acoustic units can therefore be stacked one above the other.

It is advantageous when the acoustic units and the magnet units are equidistant from one another. As a result, a defined magnetic field can act on the acoustic units.

It is advantageous when the stroke axes of the diaphragms are parallel to one another. As a result, the diaphragms radiate sound waves which are directed in the same direction. Preferably, all stroke axes are parallel to one another.

It is advantageous when the acoustic units and the magnet units are arranged one above the other, in particular in the direction of the stroke axes.

It is advantageous when the acoustic units are arranged above and below the at least two magnet units in the direction of the permanent magnetic fields.

It is advantageous when the at least two magnet units and the at least two acoustic units, in particular the coil arrangements and/or the diaphragms, are arranged congruently in at least some areas. As a result, a homogeneous permanent magnetic field or overall magnetic field acts on the acoustic unit. The permanent magnetic fields are not generated at a point, but rather by means of multiple distributed magnet elements.

It is advantageous when two acoustic units are arranged in the permanent magnetic field of a magnet unit. The magnet unit can be arranged between the two acoustic units in the direction of the stroke axes. As a result, the two acoustic units share the one permanent magnetic field of the one magnet unit.

It is advantageous when the at least two magnet units and the at least two acoustic units have at least one overlapping portion. Due to the aforementioned features, a stacked sound transducer unit is formed, with the magnet units and/or the acoustic units being stacked.

Furthermore, it is advantageous when the at least one magnet unit includes multiple magnet elements. Due to multiple magnet elements, a high-quality permanent magnetic field of the respective magnet units can be formed.

It is advantageous when the magnet elements of one magnet unit are arranged in a row or in a planar manner. As a result, the permanent magnetic field can be formed, which has a substantially constant strength along a row or over a surface. As a result, the diaphragm can be deflected in a planar and/or uniform manner.

It is useful when the magnet unit has a circuit board, with the magnet elements being arranged on and/or at the circuit board. The magnet elements are retained by means of the circuit board.

It is advantageous when the permanent magnetic field and the dynamic magnetic fields are parallel in the region of the at least one magnet unit and in the region of the at least two acoustic units. As a result, the North poles and the South poles face one another. Parallel also means that the magnetic fields are antiparallel. As a result, the North poles of the two magnetic fields face one another and a repellent effect results.

It is advantageous when the electric current, which is formed by the electrical signal, is perpendicular to the permanent magnetic field in the region of the permanent magnetic field. As a result, the Lorentz force has the maximum absolute value. For this purpose, the coil arrangements can be arranged and/or designed such that the coil arrangements conduct the electric current such that the electric current extends perpendicularly to the particular permanent magnetic fields and/or to the overall magnetic field.

It is useful when spacer elements are arranged between the acoustic units and the magnet units. As a result, the acoustic unit (including the diaphragm) can be spaced apart from the magnet unit such that the diaphragm can deflect freely along the stroke axis and, in particular, also in the direction of the magnet unit. Additionally or alternatively, the acoustic units and the magnet units can also be fixed with respect to one another by means of the spacer elements. In addition, only one spacer element can be arranged between one acoustic unit and one magnet unit, by means of which the corresponding acoustic unit and magnet unit are spaced apart and/or fixed with respect to one another.

Moreover, it is advantageous when the sound transducer unit has at least three magnet units. The sound pressure is increased as a result.

Furthermore, it is advantageous when the sound transducer unit has at least three acoustic units. More sound waves can be generated as a result. The sound pressure and the sound level can also be increased as a result.

It is advantageous when the magnet units and the acoustic units are alternatingly arranged one above the other. Consequently, one acoustic unit is associated with each magnet unit.

It is useful when one magnet unit is respectively arranged above and below the acoustic unit in the direction of the stroke axes of the acoustic units. Each acoustic unit can be arranged between two magnet units in the direction of the stroke axis of the acoustic unit. Consequently, the acoustic unit is arranged in two magnetic fields. With respect to the multiple acoustic units and magnet units, this can mean that a magnet unit is arranged first, followed by an acoustic unit, then by another magnet unit, then an acoustic unit and, at the end, another magnet unit, in the direction in which the acoustic units and magnet units are stacked, which can be the direction of the stroke axes. This is repeated in a corresponding manner for as long as there are magnet units and acoustic units present.

It is advantageous when the multiple acoustic units and the multiple magnet units are alternatingly arranged one above the other. Consequently, one acoustic unit is associated with each magnet unit.

An improvement results when the sound transducer unit has a front volume and a back volume.

It is useful when the acoustic units and/or the magnet units are arranged such that these separate the front volume and the back volume from one another.

An improvement results when the acoustic units can emit the sound waves into the front volume and into the back volume.

It is advantageous when the diaphragms can deflect in the direction of the front volume and in the direction of the back volume.

It is useful when the sound transducer unit includes a separating arrangement, which separates the front volume and the back volume from one another, in particular, in a soundproof and/or sound-impermeable manner.

It is advantageous when the acoustic units, the at least one magnet unit and/or the spacer elements separate the front volume and the back volume from one another. The acoustic units, the at least one magnet unit, the circuit boards and/or the spacer elements and/or the separating arrangement can be soundproof and/or sound-impermeable. The acoustic units, the at least one magnet unit, and/or the spacer elements and/or the separating arrangement can therefore be impermeable to sound. The acoustic units, the at least one magnet unit, and/or the spacer elements and/or the separating arrangement can therefore conduct or redirect sound.

The separating arrangement can also be formed by means of at least one acoustic unit, at least one magnet unit, at least one circuit board and/or at least one spacer element.

An improvement results when the sound transducer unit has a front exit opening, through which the sound waves can exit the front volume and the sound transducer unit. The front exit opening is therefore associated with the front volume.

It is useful when the sound transducer unit has a rear exit opening, through which the sound waves can exit the back volume and the sound transducer unit. The rear exit opening is therefore associated with the back volume.

It is advantageous when the separating arrangement and/or a housing of the sound transducer unit are/is arranged such that the sound from the acoustic units can be combined in the front volume and/or in the back volume. As a result, the sound from the at least two acoustic units can be combined and conducted together to the front exit opening and/or the rear exit opening. The separating arrangement and/or the housing are/is arranged such that these can combine the sound from the at least two acoustic units and conduct these together to the front exit opening and/or the rear exit opening.

It is advantageous when the separating arrangement, the housing, the acoustic units and/or the magnet units are arranged such that the sound emitted from the acoustic units is initially redirected transversely to the stroke axes and is subsequently redirected such that the sound once again extends in the direction along the stroke axes. The sound from all acoustic units can also be deflected as described. It is also to be noted, however, that this does not need to apply for the uppermost or the lowermost acoustic unit, since a magnet unit does not need to be arranged above or underneath the respective acoustic units. With respect to the uppermost or the lowermost acoustic unit, the sound can reach the corresponding exit opening unobstructed. The sound conduction described here can also be formed by the sound conduction channels described further below.

It is additionally or alternatively advantageous when a side region or a lateral region, i.e., a side region or a lateral region in a transverse direction oriented transversely to the stroke axis, of the acoustic unit and/or of the magnet unit is open. The opposite side region or lateral region can be closed. As a result, the sound can exit in this open side region or lateral region. This is prevented at the closed side region or lateral region. As a result, the sound can be conducted laterally around the acoustic unit and/or the magnet unit.

It is advantageous when the sound transducer unit includes a first and a second sound conduction channel, which can combine the sound from the acoustic units and/or conduct the sound from the acoustic units laterally past the acoustic units and/or magnet units. The sound conduction channels can also conduct the sound towards the associated exit openings. In addition, the first sound conduction channel is associated with the front volume and the second sound conduction channel is associated with the back volume. The sound conduction channels initially conduct the sound transversely to the stroke axis, in particular until the sound is conducted laterally over the acoustic units and/or magnet units, and then towards the stroke axis, in particular up to the corresponding exit opening.

It is also advantageous when the sound conduction channel is arranged laterally next to the acoustic units and/or the magnet units. Laterally means, in this case, and additionally or alternatively for the preceding description and/or the following description, in a transverse direction oriented transversely to the stroke axis. The first sound conduction channel can be associated with the front volume and the second sound conduction channel can be associated with the back volume. The sound conduction channels are delimited by the separating arrangement, in particular the acoustic units, the magnet units and/or the spacer elements and the housing.

The sound conduction channels can bundle the sound waves from the acoustic units, in particular from all acoustic units, and conduct these to the respective exit openings. The sound conduction channels can therefore conduct, redirect, bundle and/or combine the sound waves.

The sound conduction channels are oriented transversely to the stroke axis in the region of the acoustic units and/or the magnet units. In the region laterally next to the acoustic units and/or the magnet units, the sound conduction channels are oriented towards the stroke axis. Therefore, the sound conduction channels have a sharp bend and/or are curved. The first sound conduction channel leads to the front exit opening and the second sound conduction channel leads to the rear exit opening.

It is advantageous when the separating arrangement, the housing, the acoustic units and/or the magnet units are arranged such that the sound emitted by the, in particular by all, acoustic units can be conducted, in particular laterally, around the magnet units. As a result, the sound which is generated by one acoustic unit can be conducted past the other acoustic units and/or magnet units. The sound can be conducted to the exit openings while being only slightly affected by the other acoustic units and/or magnet units.

It is advantageous when a lateral region between one acoustic unit and the magnet unit arranged directly above or underneath in the direction of the stroke axes is closed, in particular by means of a spacer element. A lateral region which is opposite the open regions, i.e., transverse to the stroke axis, is advantageously open. As a result, the sound generated by one acoustic unit is redirected precisely in the direction of one side. This side is arranged transversely to the stroke axis, in particular next to the acoustic units and/or magnet units.

Moreover, it is advantageous when the positions of the closed and the open lateral regions between the acoustic units and the magnet units alternate in the direction of the stroke axes. This means, between one acoustic unit and the next magnet unit, for example, the left lateral region is open and the right lateral region is closed. The closed and the open lateral regions are interchanged between the acoustic unit situated above or underneath and the corresponding magnet unit. As a result, the front volume and/or the back volume are serpentine.

It is advantageous when the emitted sound waves of the acoustic unit, in particular of all acoustic units, are emitted and/or combined in one common front volume and/or one common back volume. All acoustic units therefore have a common front volume and/or a common back volume. The front volumes and/or back volumes of all acoustic units are therefore connected to one another. Moreover, the front volumes and/or back volumes of all acoustic units are combined and jointly conduct to the front and/or the back exit opening, which are preferably spaced apart from the acoustic units in the direction of the stroke axis. The front volumes and/or rear volumes can also conduct around the acoustic units, such that the sound waves are initially conducted laterally, i.e., in the transverse direction transversely to the stroke axis, and then once again in the direction of the stroke axis.

Additionally or alternatively, it is advantageous when the acoustic units, in particular all acoustic units, have one, in particular single, common front volume and one, in particular single, common back volume.

Furthermore, it is advantageous when the front exit opening and/or the rear exit opening are/is spaced apart from the acoustic units in the direction of the stroke axis. Since the sound waves are emitted mainly in the direction of the stroke axis, the emitted sound waves reach the front exit opening and/or the rear exit opening in this arrangement. This is also the shortest path to the front exit opening and/or to the rear exit opening such that interferences and/or diffractions of the sound waves are prevented.

Additionally or alternatively, the, in particular all, stroke axes can be oriented and/or point in the direction of the front exit opening and/or the rear exit opening.

According to one advantageous enhanced embodiment of the invention, it is useful when the acoustic units can emit the sound waves in the direction of the front exit opening and/or the rear exit opening. As a result thereof, the sound waves reach the front exit opening and/or the rear exit opening on the shortest path, such that diffractions and/or interferences are prevented.

An advantage results when the coil arrangement is arranged on and/or in the diaphragm. As a result, the acoustic unit is particularly planar.

It is useful when the coil arrangement is formed by means of at least one coil layer. The coil layer and the acoustic unit are then planar.

It is useful when the coil arrangement includes multiple coil layers. As a result, the dynamic magnetic field can be improved without excessively increasing a thickness of the acoustic unit. Accordingly, a higher electric current can be conducted through the coil arrangement such that a stronger Lorentz force can be formed, which deflects the diaphragm.

It is also advantageous when the multiple coil layers of the coil arrangement are electrically conductively connected to one another by means of contacting elements. As a result, the coil layers can be actuated by means of a connector element.

It is advantageous when the multiple coil layers of the coil arrangement are arranged one above the other. As a result, the generated dynamic magnetic field can be amplified. Accordingly, a higher electric current can be conducted through the coil arrangement such that a stronger Lorentz force can be formed, which deflects the diaphragm.

It is advantageous when insulating layers are arranged between the multiple coil layers of the coil arrangement. Consequently, the coil layers are electrically insulated from one another.

An advantage results when the contacting elements extend through the insulating layers.

It is advantageous when the at least one coil layer is serpentine. As a result, the electric current can be conducted perpendicularly to the permanent magnetic field such that the absolute value of the Lorentz force is maximized. The at least one coil layer is arranged such that the permanent magnetic field extends perpendicularly to the coil layer in the region of the coil arrangement.

It is useful when the back volume and/or the front volume are/is serpentine.

Moreover, it is advantageous when the sound transducer unit includes a control unit for controlling at least the acoustic units.

An improvement results when the control unit is designed in a manner that the control unit can generate the electrical signals for the coil arrangements of the acoustic units such that the resultant dynamic magnetic fields of the particular acoustic units are oriented identically or oppositely to one another.

Additionally or alternatively, the control unit can be designed in a manner that the control unit can generate the electrical signals for the coil arrangements of the acoustic units to allow electric currents to be generated in the coil arrangements from the electrical signals, such that the resultant Lorentz forces are oriented identically or oppositely to one another. When the Lorentz forces have the same orientation, the diaphragm is deflected in the same direction.

Moreover, it is advantageous when the control unit is designed in a manner that the control unit can generate the electrical signals for the respective coil arrangements such that dynamic magnetic fields of the type are generated in a way to allow the deflection of the diaphragms to be identical to one another. Additionally or alternatively, the control unit can be designed in a manner that the control unit can generate the electrical signals for the particular coil arrangements such that electric currents can be generated in the coil arrangements from the electrical signals to allow resultant Lorentz forces to be generated such that the deflection of the diaphragms is identical with respect to one another and/or oriented in the same direction. As a result, the diaphragms are deflected synchronously and/or simultaneously in the direction of the front volume and in the direction of the back volume. Consequently, the sound waves generated by the diaphragms are emitted simultaneously and/or synchronously into the front volume or the back volume. The deflections of the diaphragms are, in particular, in-phase. The sound waves therefore amplify each other.

It is useful when the control unit is designed such that the electrical signals for the respective coil arrangements of two acoustic units directly adjacent to a magnet unit are mutually inverted or identical.

It is advantageous when the control unit can actuate the acoustic units such that the respective diaphragms deflect synchronously and/or simultaneously in the direction of the front volume and in the direction of the back volume. As a result, the sound waves are emitted synchronously and/or simultaneously and/or inphase into the front volume and into the back volume.

The present subject matter further relates to a method for operating a sound transducer unit. The sound transducer unit has at least one feature of the preceding description and/or the following description.

Moreover, the at least two acoustic units are operated in synchronization with one another. Since at least two magnet units and at least two acoustic units are present, the sound quality and the power of the sound transducer unit can be improved due to the synchronization of the acoustic units, in particular due to the synchronization during actuation by the control unit. With respect to the deflection of the respective diaphragms, it must be taken into account that two magnet units are present, the permanent magnetic fields of which overlap. The distances between the respective diaphragms and coil arrangements to the respective magnet units are advantageously taken into account. For example, the permanent magnetic field of the two magnet units can be weaker in the region of the first coil arrangement than in the region of the second coil arrangement, since a distance between the first coil arrangement to the two magnet units is greater overall than for the second coil arrangement. Furthermore, with respect to the magnet units and the acoustic units, which are arranged one above the other, one acoustic unit has only one magnet unit directly next to itself, whereas the other acoustic unit is arranged between two magnet units.

It is advantageous when the two acoustic units, between which the magnet unit is arranged, in particular directly arranged, are operated oppositely or identically to one another.

It is useful when the electrical signals and the resultant electric currents for operating the two acoustic units, between which a magnet unit is arranged, in particular directly arranged, are mutually inverted or identical.

It is advantageous when the electrical signals and the resultant electric currents are formed, in particular by the control unit, such that the diaphragms are deflected in the same direction with respect to one another or in the opposite direction with respect to one another. When there are multiple acoustic units, the diaphragms can be deflected such that the diaphragms of two consecutive acoustic units at a time are oppositely deflected.

The present subject matter also relates to a magnet unit for a sound transducer unit. The sound transducer unit has at least one feature of the preceding description and/or the following description. The magnet unit has at least one feature of the preceding description and/or of the following description.

The present subject matter also relates to the use of a magnet unit for a sound transducer unit. The sound transducer unit and the magnet unit have at least one feature of the preceding description and/or of the following description.

The present subject matter also relates to an acoustic unit for the sound transducer unit. The sound transducer unit and the acoustic unit have at least one feature of the preceding description and/or of the following description.

The present subject matter also relates to the use of an acoustic unit. The sound transducer unit and the acoustic unit have at least one feature of the preceding description and/or of the following description.

BRIEF DESCRIPTION OF THE FIGURES

Further advantages of the invention are described in the following exemplary embodiments, wherein.

DETAILED DESCRIPTION

In the following description of the alternative exemplary embodiments of the present subject matter, the same reference signs are utilized for features that are identical or at least comparable in terms of their configuration and/or mode of operation. Provided the features are not described in detail again, their design and/or mode of operation correspond/corresponds to the design and mode of operation of the above-described features. For the sake of greater clarity, reference signs for previously described components may have not been individually included in the figures.

Figure 1:
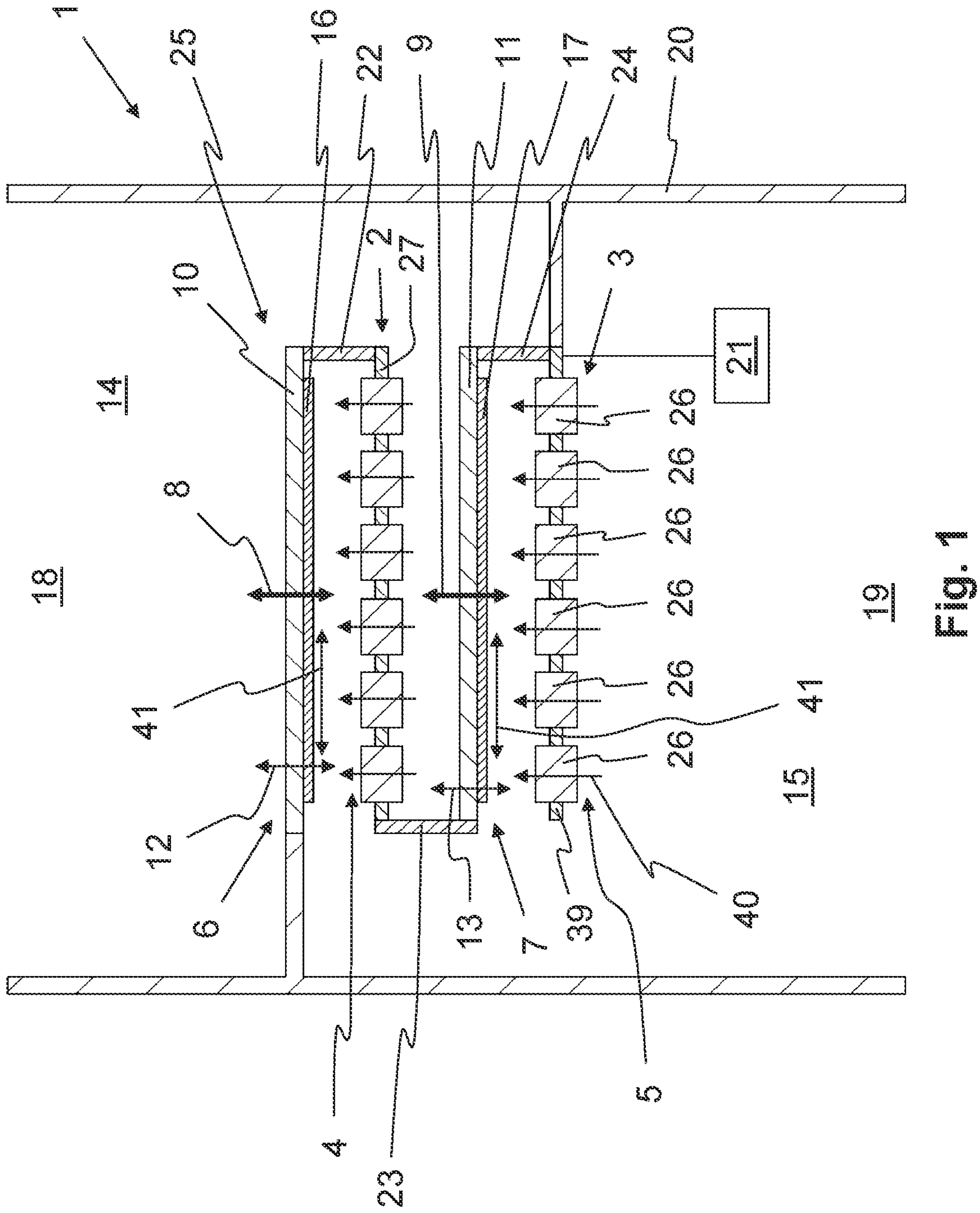
FIG. 1 shows a cross-section of a schematic view of a sound transducer unit having two magnet units and two acoustic units.

FIG. 1 shows a cross-section of a schematic view of a sound transducer unit 1 having two magnet units 2, 3 and two acoustic units 6, 7. The sound transducer unit 1 can be a flat panel speaker. Moreover, the sound transducer unit 1 can be a magnetostatic loudspeaker.

The sound transducer unit 1 has at least two magnet units 2, 3, each of which has a permanent magnetic field 4, 5, respectively. The permanent magnetic field 4, 5 can be formed, for example, by means of permanent magnets. The permanent magnetic fields 4, 5 have a temporally substantially constant magnetic field. The two permanent magnetic fields 4, 5 shown here overlap each other and form an overall magnetic field (not shown here).

The sound transducer unit 1 includes at least two acoustic units 6, 7, which have at least one diaphragm 10, 11, respectively, which is deflectable along a stroke axis 8, 9, respectively, for generating sound waves. At least one diaphragm 10, 11 is associated with each acoustic unit 6, 7, respectively, as shown here. The acoustic units 6, 7 have a coil arrangement 16, 17, respectively. The coil arrangements 16, 17 are able to form a dynamic magnetic field 12, 13, respectively, by means of an electrical signal, with the acoustic units 6, 7 being coupled to the magnet units 2, 3, respectively, via the two magnetic fields 4, 5, 12, 13 such that the diaphragms 10, 11 are deflectable along the stroke axis 8, 9, respectively.

Due to the electrical signals, electric currents are also induced in the coil arrangements 16, 17. The electric currents together with the permanent magnetic fields 4, 5 induce a Lorentz force such that the diaphragms 10, 11 are deflected.

Moreover, at least the at least two magnet units 2, 3 and the at least two acoustic units 6, 7 are arranged alternatingly one above the other. As is apparent here, the second acoustic unit 7 is arranged between the first and the second magnet units 2, 3. The first acoustic unit 6 is arranged above the first magnet unit 2. As a result, the first magnet unit 2 is arranged between the first and the second acoustic units 6, 7. As a result, a stacked sound transducer unit 1 is formed. The acoustic units 6, 7 and the magnet units 2, 3 are stacked.

As shown in the present exemplary embodiment, the sound transducer unit 1 has a front volume 14 and a back volume 15.

An electrical signal can be supplied to the coil arrangements 16, 17 such that an electric current flows in the coil arrangements 16, 17. The electric current can interact with the permanent magnetic fields 4, 5, forming the Lorentz force. This Lorentz force enables the diaphragms 10, 11 to be deflected.

The two diaphragms 10, 11 can be deflected upward along the stroke axes 8, 9, respectively, and in the direction of the front volume 14. If the poles of the electrical signal of the two coil arrangements 16, 17 are reversed, however, the two diaphragms 10, 11 are deflected downward and in the direction of the back volume 15. It is advantageous that the two diaphragms 10, 11 are deflected synchronously and/or identically and/or in-phase with one another.

According to one advantageous enhanced embodiment of the present subject matter, it is useful when the stroke axes 8, 9 of the diaphragms 10, 11 are parallel to one another. As a result, the emission direction of the generated sound waves is parallel. The acoustic units 6, 7 are arranged such that the stroke axes 8, 9 and, thus, the emission directions of the generated sound waves are parallel.

It is advantageous when the acoustic units 6, 7 and the magnet units 2, 3 are arranged one above the other, in particular in the direction of the stroke axes 8, 9. Moreover, it is advantageous when the acoustic units 6, 7 are arranged above and below the magnet units 2, 3 in the direction of the permanent magnetic field 4, 5.

An advantage results when the magnet units 2, 3 and the two diaphragms 10, 11 and/or the coil arrangements 16, 17 and/or the acoustic units 6, 7 are arranged congruently at least in some areas. An advantage results when the at least two magnetic units 2, 3 and the at least two acoustic units 6, 7 have at least one overlapping portion.

According to one advantageous enhanced embodiment, it is useful when the permanent magnetic fields 4, 5 and the dynamic magnetic fields 12, 13 are parallel at least in the region of the magnet units 2, 3 and in the region of the at least two acoustic units 6, 7.

Additionally or alternatively, the electric currents can be oriented in the coil arrangements 16, 17 such that the electric currents flow perpendicularly to the permanent magnetic fields 4, 5, such that the Lorentz force is formed.

It is useful when the acoustic units 6, 7 and/or the magnet units 2, 3 are arranged such that these components separate the front volume 14 and the back volume 15 from one another. In the present exemplary embodiment, at least some areas of the front volume 14 and of the back volume 15 are separated from one another by the first acoustic unit 6, by the first magnet unit 2 and by the second acoustic unit 7.

It is also advantageous, as shown here, when the acoustic units 6, 7 can emit the sound waves into the front volume 14 and into the back volume 15.

It is useful when the diaphragms 10, 11 can deflect in the direction of the front volume 14 and in the direction of the back volume 15. However, the two diaphragms 10, 11 can emit the sound waves into the front volume 14 and into the back volume 15.

It is advantageous when the sound transducer unit 1 has a front exit opening 18, through which the sound waves can exit the front volume 14 and the sound transducer unit 1.

According to one advantageous enhanced embodiment, it is useful when the sound transducer unit 1 has a rear exit opening 19, through which the sound waves can exit the back volume 15 and the sound transducer unit 1. The front exit opening 18 and the rear exit opening 19 are shown merely schematically in this case. In the intended arrangement of the sound transducer unit 1, the front exit opening 18 faces the ear and a user. According to the present exemplary embodiment, the sound transducer unit 1 has a housing 20, with the front exit opening 18 and/or the rear exit opening 19 being arranged in this housing 20.

It is advantageous when the front exit opening 18 and/or the rear exit opening 19 are/is spaced apart from the acoustic units 6, 7 in the direction of the stroke axes 8, 9. As a result, the acoustic units 6, 7 and the diaphragms 10, 11 can emit the sound waves directly and in the direction of the front exit opening 18 and/or in the direction of the rear exit opening 19.

According to one advantageous enhanced embodiment, it is useful when the acoustic units 6, 7 can emit the sound waves in the direction of the front exit opening 18 and/or the rear exit opening 19. However, the emitted sound waves reach the front exit opening 18 and/or the rear exit opening 19 on a short path.

It is advantageous when the back volume 15 and/or the front volume 14 are/is serpentine.

Moreover, it is advantageous when the sound transducer unit 1 includes a control unit 21 for controlling at least the acoustic units 6, 7. The control unit 21 is connected at least to the acoustic units 6, 7 via lines (not described in greater detail).

An improvement results when the control unit 21 is designed in a manner that the control unit 21 can generate the electrical signals for the coil arrangements 16, 17 of the acoustic units 6, 7 such that the resultant dynamic magnetic fields 12, 13 of the particular acoustic units 6, 7 are oriented identically or oppositely to one another.

It is advantageous when the control unit 21 is designed in a manner that the control unit 21 can generate the electrical signals for the particular coil arrangements 16, 17 to allow the dynamic magnetic fields 12, 13 of the type to be generated such that the deflection of the diaphragms 10, 11 is identical to one another.

It is useful when the control unit 21 is designed such that the electrical signals for the particular coil arrangements 16, 17 of two acoustic units 6, 7 directly adjacent to a magnet unit 2, 3 are mutually inverted or identical.

According to one advantageous enhanced embodiment, the present subject matter is useful when the control unit 21 can actuate the acoustic units 6, 7 such that the diaphragms 10, 11, respectively, deflect synchronously along the stroke axes 8, 9, in particular in the direction of the front volume 14 and in the direction of the rear volume 15. In particular, it is advantageous when the control unit 21 can actuate the acoustic units 6, 7 such that the particular diaphragms 10, 11 deflect in-phase. As a result, the diaphragms 10, 11 emit the same sound among themselves, the sound waves of the respective acoustic units 6, 7 adding up.

Moreover, it is advantageous when the control unit 21 forms the electrical signals such that, as a result, the electric currents are formed in the coil arrangements 16, 17 to allow the diaphragms 10, 11 to be deflected synchronously. Consequently, the sound waves are superimposed and intensify due to constructive interference.

It is also advantageous when the deflection of the at least two acoustic units 6, 7 and of the diaphragms 10, 11 is synchronized for operating a sound transducer unit 1.

An advantage results when the two acoustic units 6, 7, between which the magnet unit 2, 3 is arranged, in particular directly arranged, are operated oppositely to one another.

It is useful when the electrical signals for operating the two acoustic units 6, 7, between which a magnet unit 2, 3 is arranged, in particular directly arranged, are mutually inverted.

Moreover, it is advantageous, as shown here, when spacer elements 22, 23, 24 are arranged between the acoustic units 6, 7 and the magnet units 2, 3. By means of the spacer elements 22, 23, 24, the acoustic units 6, 7 and the magnet units 2, 3 are spaced apart in the direction of the stroke axes 8, 9. As a result, the diaphragms 10, 11 can be deflected along the stroke axis 8, 9 without impacting the magnet units 2, 3. Additionally or alternatively, the spacer elements 22, 23, 24 can also connect the acoustic units 6, 7 and the magnet units 2, 3 to one another.

It is advantageous when the sound transducer unit 1 has a separating arrangement 25, which separates the front volume 14 and the back volume 15 from one another. The separating arrangement 25 is formed in this case by means of the spacer elements 22, 23, 24, the acoustic units 6, 7 and the magnet units 2, 3 and at least partially by the housing 20. Due to the separation of the front volume 14 and the back volume 15, the sound waves are prevented from being exchanged between these two volumes 14, 15 and interfering with one another.

Moreover, it is advantageous when the acoustic units 6, 7, the at least one magnet unit 2, 3 and/or the spacer elements 22, 23, 24 separate the front volume 14 and the back volume 15 from one another. The separating arrangement 25 can be formed from these elements and, at least in part, the housing 20.

It is useful when the at least one magnet unit 2, 3 has multiple magnet elements 26. Preferably, all magnet units 2, 3 have the magnet elements 26. For the sake of clarity, only the magnet elements 26 of the second magnet unit 3 are provided with a reference character. The magnet elements 26 can be in the form, for example, of permanent magnets.

According to one advantageous enhanced embodiment, the present subject matter is useful when the magnet elements 26 of one magnet unit 2, 3 are arranged in a row or in a planar manner. However, a linear or planar permanent magnetic field 4, 5 can be formed.

The magnet elements 26 can be arranged such that the magnet elements 26 generate permanent magnetic fields 4, 5 and/or an overall magnetic field, which extend in a transverse direction in the regions of the acoustic units 6, 7, in particular in the regions of the coil arrangements 16, 17. The transverse direction is perpendicular to the respective stroke axes 8, 9 in this case. The permanent magnetic fields 4, 5 and/or an overall magnetic field therefore extend transversely to a magnetization direction of the magnet elements 26, with the magnetization direction 40 being shown here by means of arrows at the particular magnet elements 26. For the sake of clarity, the magnetization direction 40 is provided with a reference character only at one magnet element 26.

The magnetization directions 40 are parallel to one another in this case, such that the permanent magnetic fields 4, 5 and/or the overall magnetic field can be formed so as to extend in a transverse direction in the regions of the acoustic units 6, 7, in particular in the regions of the coil arrangements 16, 17. The permanent magnetic fields 4, 5 and/or the overall magnetic field are therefore not oriented perpendicularly to the acoustic units 6, 7, in particular to the coil arrangements 16, 17. Direction vectors of the permanent magnetic fields 4, 5 and/or of the overall magnetic field therefore extend in the direction of the acoustic units 6, 7 and in the direction of the coil arrangements 16, 17 and are arranged therein.

As is apparent here, the permanent magnetic fields 4, 5 and/or the overall magnetic field have transverse components 41 of the magnetic field. The transverse components 41 are arranged in the region of the acoustic units 6, 7 and in the region of the coil arrangements 16, 17. As a result, the diaphragms 10, 11 can be deflected by means of the Lorentz force. Moreover, the transverse components 41 are oriented along the acoustic units 6, 7 and the coil arrangements 16, 17 and/or transversely to the stroke axes 8, 9.

Moreover, the transverse components 41 are shown only in a sub-region by means of arrows. The transverse components 41 preferably extend along the entirety of the acoustic units 6, 7 and the coil arrangements 16, 17 or at least largely along the acoustic units 6, 7 or the coil arrangements 16, 17. In addition, the transverse components 41 are characterized by means of a double arrow. This means, however, that there are portions in which the transverse component 41 is directed in the one direction and that there are, in particular adjacent, portions in which the transverse component 41 is directed in the opposite direction. In other words, there are portions in which the transverse component 41 is directed toward the left or toward the right in the present FIG. 1. These portions can alternate.

Moreover, it is advantageous when the magnet unit 2, 3 includes a circuit board 27, 39, with the magnet elements 26 being arranged on and/or at the circuit board 27, 39. As is apparent here, each magnet unit 2, 3 has one circuit board 27, 39, respectively.

Figure 2:
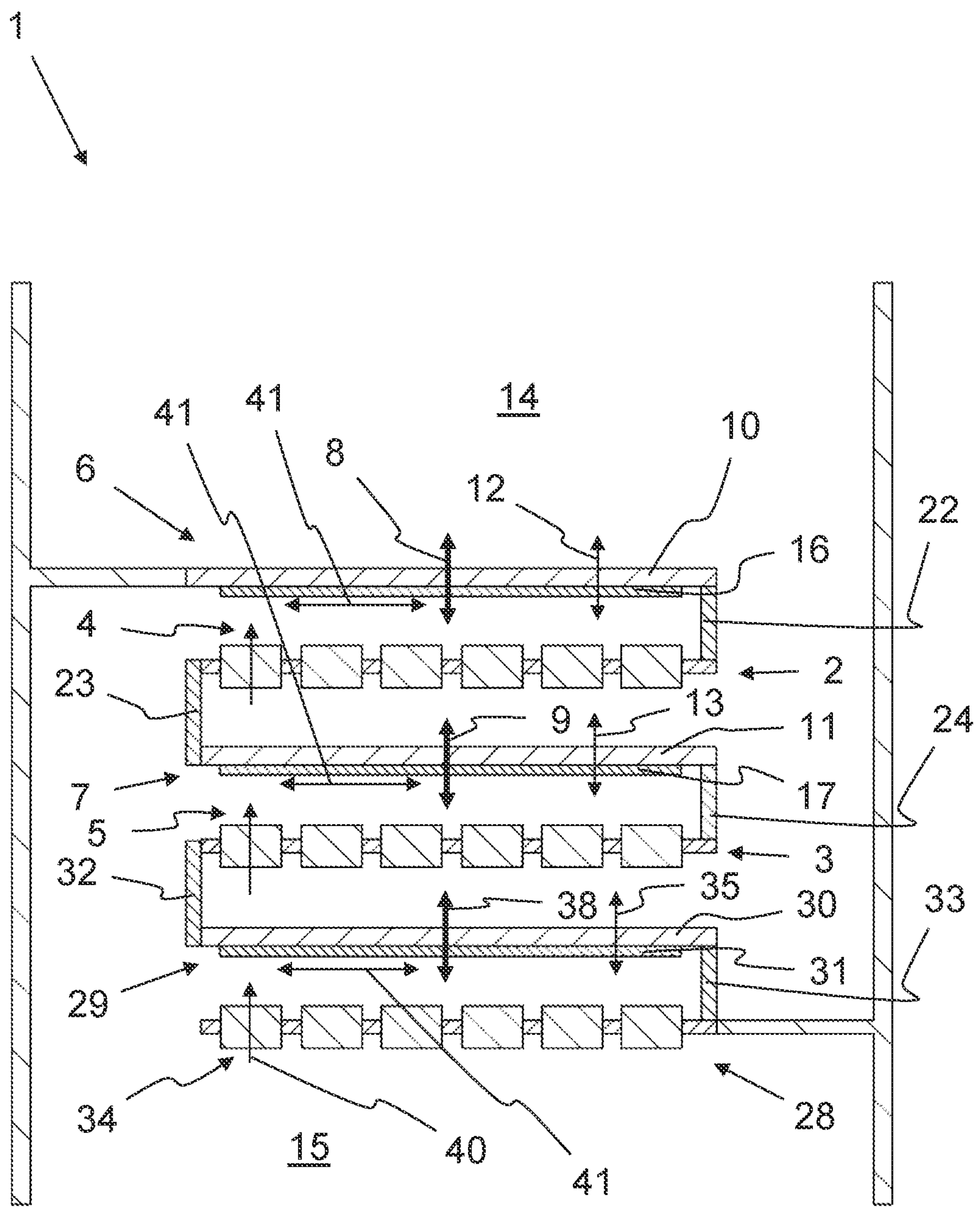
FIG. 2 shows a cross-section of a schematic view of a sound transducer unit having multiple magnet units and multiple acoustic units.

FIG. 2 shows a cross-section of a schematic view of a sound transducer unit 1 having multiple magnet units 2, 3, 28 and multiple acoustic units 6, 7, 29. For the sake of simplicity, the magnet units 2, 3, 28 and the acoustic units 6, 7, 29 will not be explained again in detail. The magnet units 2, 3, 28 and the acoustic units 6, 7, 29 are identical to one another. In comparison to the sound transducer unit 1 from FIG. 1, the sound transducer unit 1 shown here has an additional third magnet unit 28 and an additional third acoustic unit 29. Correspondingly, the third magnet unit 28 has a third permanent magnetic field 34. Moreover, the third acoustic unit 29 has a third diaphragm 30 and a third coil arrangement 31. The third coil arrangement 31 forms the third dynamic magnetic field 35 in this case. Moreover, the third diaphragm 30 is deflectable along a third stroke axis 38.

In the following description of this exemplary embodiment and in the following description of the following exemplary embodiments, the same reference characters are used for features, which are identical with respect to their design and/or mode of operation in comparison to the at least one preceding exemplary embodiment. Unless explained otherwise, the design and/or mode of operation of these features correspond(s) to that which has been described above. Furthermore, for the sake of clarity, any features which have already been shown in and described with reference to the preceding figure are no longer shown.

According to the exemplary embodiment shown here, the three magnet units 2, 3, 28 and the three acoustic units 6, 7, 29 are alternatingly arranged one above the other. The diaphragms 10, 11, 30 can be deflected, for example, in particular synchronously, into the front volume 14 or into the back volume 15.

An electric current is applied to each of the three coil arrangements 16, 17, 31 such that the currents interact with the permanent magnetic fields 4, 5, 34 and with the overall magnetic field, and the Lorentz force is formed such that the particular diaphragms 10, 11, 30 deflect and generate sound. The flows flow into the region of the transverse components 41 of the permanent magnetic fields 4, 5, 34 and of the overall magnetic field.

Due to the three magnet units 2, 3, 28 shown here, and due to the three acoustic units 6, 7, 29, the sound pressure and, therefore, the power of the sound transducer unit 1 can be increased.

Figure 3:
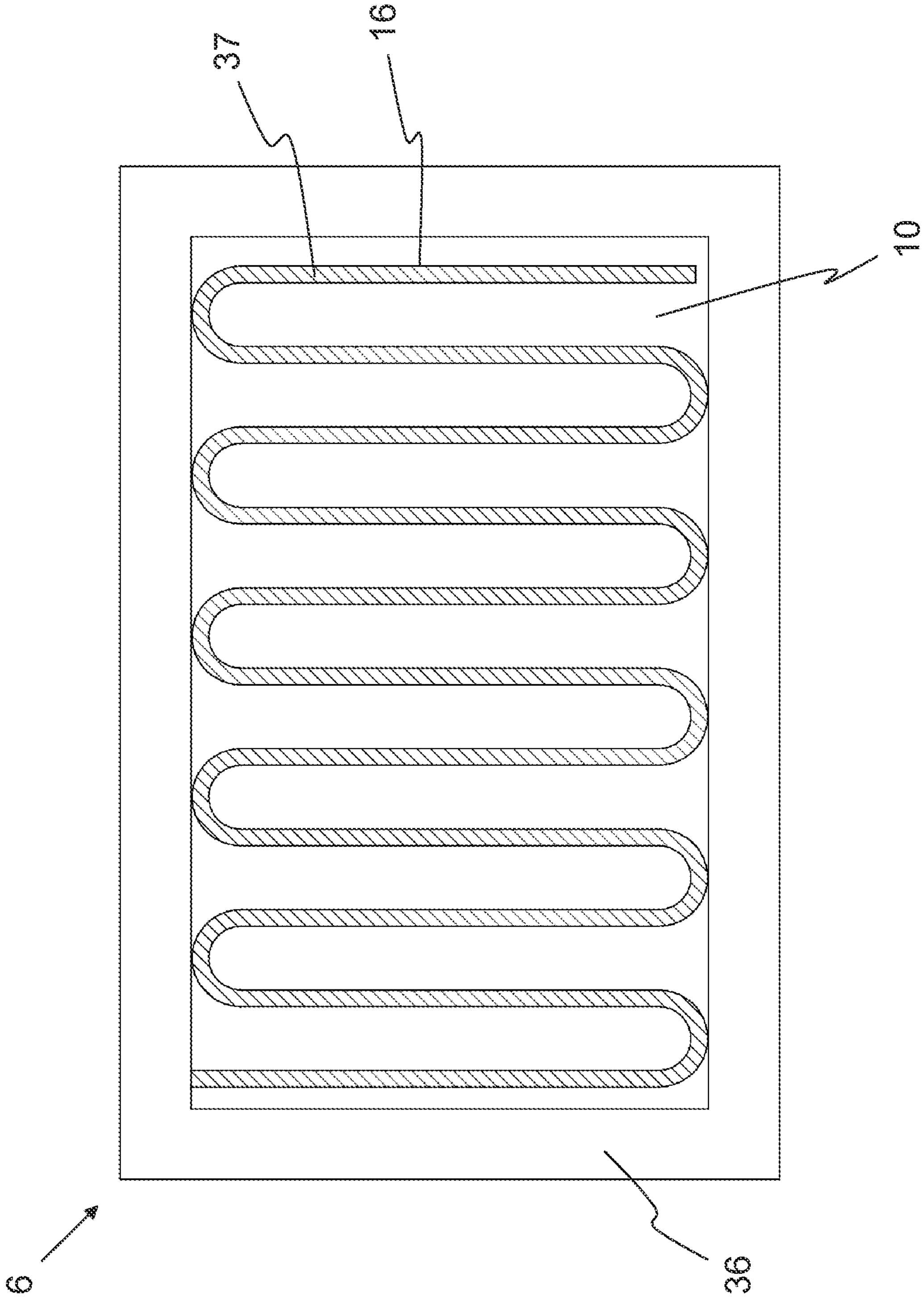
FIG. 3 shows a top view of the acoustic unit and of the coil arrangement.

FIG. 3 shows a top view of the acoustic unit 6 and of the coil arrangement 16. In this case, the reference characters are used for the first acoustic unit 6 and for the first coil arrangement 16. As mentioned above, the acoustic units 6, 7, 29 are identical to one another. The same applies when the sound transducer unit 1 has even more acoustic units 6, 7, 29 and magnet units 2, 3, 28.

It is advantageous when the coil arrangements 16 are arranged on and/or in the particular diaphragms 10. According to the present exemplary embodiment, the coil arrangement 16 is arranged on the diaphragm 10. For example, the coil arrangement is adhesively bonded onto the diaphragm 10. As shown, the coil arrangement 16 is formed by means of an electrical conductor 37. As is apparent in FIG. 3, the electrical conductor 37 is serpentine. The first dynamic magnetic field 12 can be formed with the coil arrangement 16 shown in FIG. 3. An electric current also flows in the coil arrangement 16 shown in the illustrated embodiment, with the electric current flowing in a meandering manner. In the embodiment of FIG. 3, the electric current flows alternatingly upward and downward. The electric current is oriented perpendicularly to the permanent magnetic fields 4, 5, 34 and to the overall magnetic field in this case, in particular perpendicularly to the transverse components 41, such that the Lorentz force is formed.

According to the present exemplary embodiment, the first acoustic unit 6 shown in FIG. 3 has a frame 36. The diaphragm 10 is arranged and/or fastened on the frame 36. The frame 36 can act as a carrier for the diaphragm.

It is useful when the particular coil arrangements are formed by means of at least one coil layer.

Figure 4:
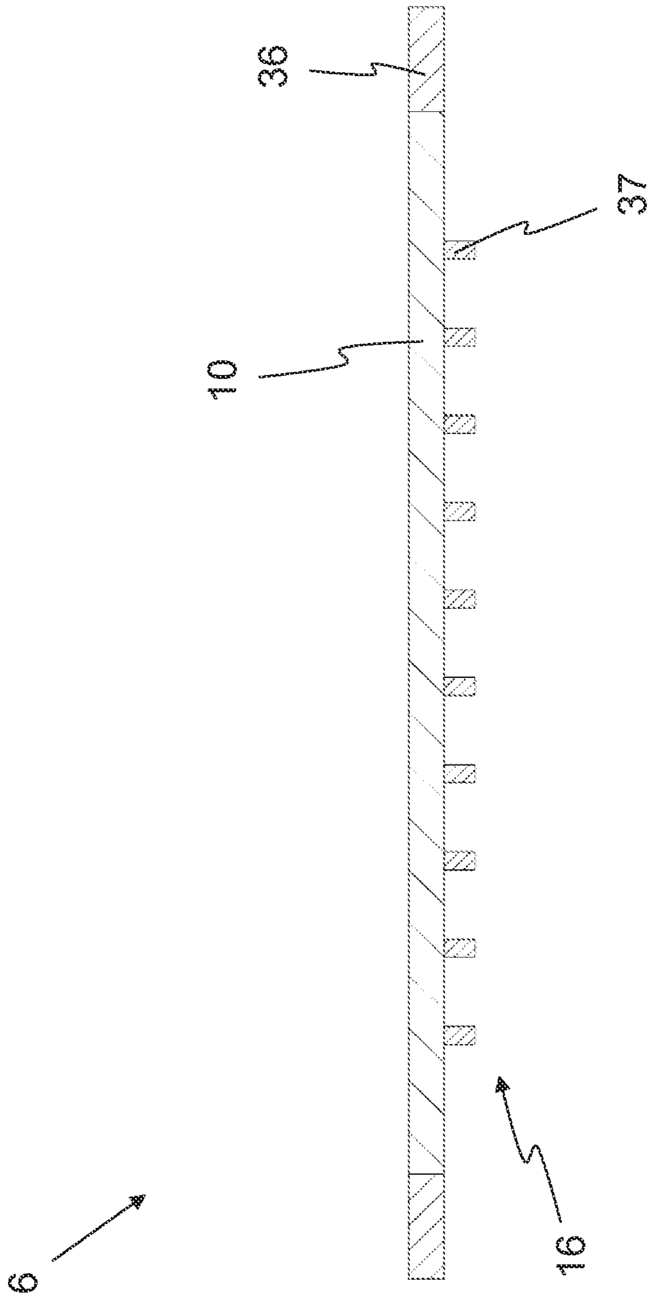
FIG. 4 shows a cross-section of the acoustic unit with the coil arrangement.

FIG. 4 shows a cross-section of the acoustic unit 6 with the coil arrangement 16 and the diaphragm 10. As shown in FIG. 4, the coil arrangement 16 or the electrical conductor 37 is arranged on the diaphragm 10. The coil arrangement 16 can also have multiple coil layers, each of which has electrical conductors 37, in particular in a meandering shape. The coil layers can be arranged one above the other and/or in a stacked manner.

The electric currents flow, as described above, perpendicularly to the permanent magnetic fields 4, 5, 34 and to the overall magnetic field, in particular perpendicularly to the transverse components 41, such that the Lorentz force is formed.

Figure 5:
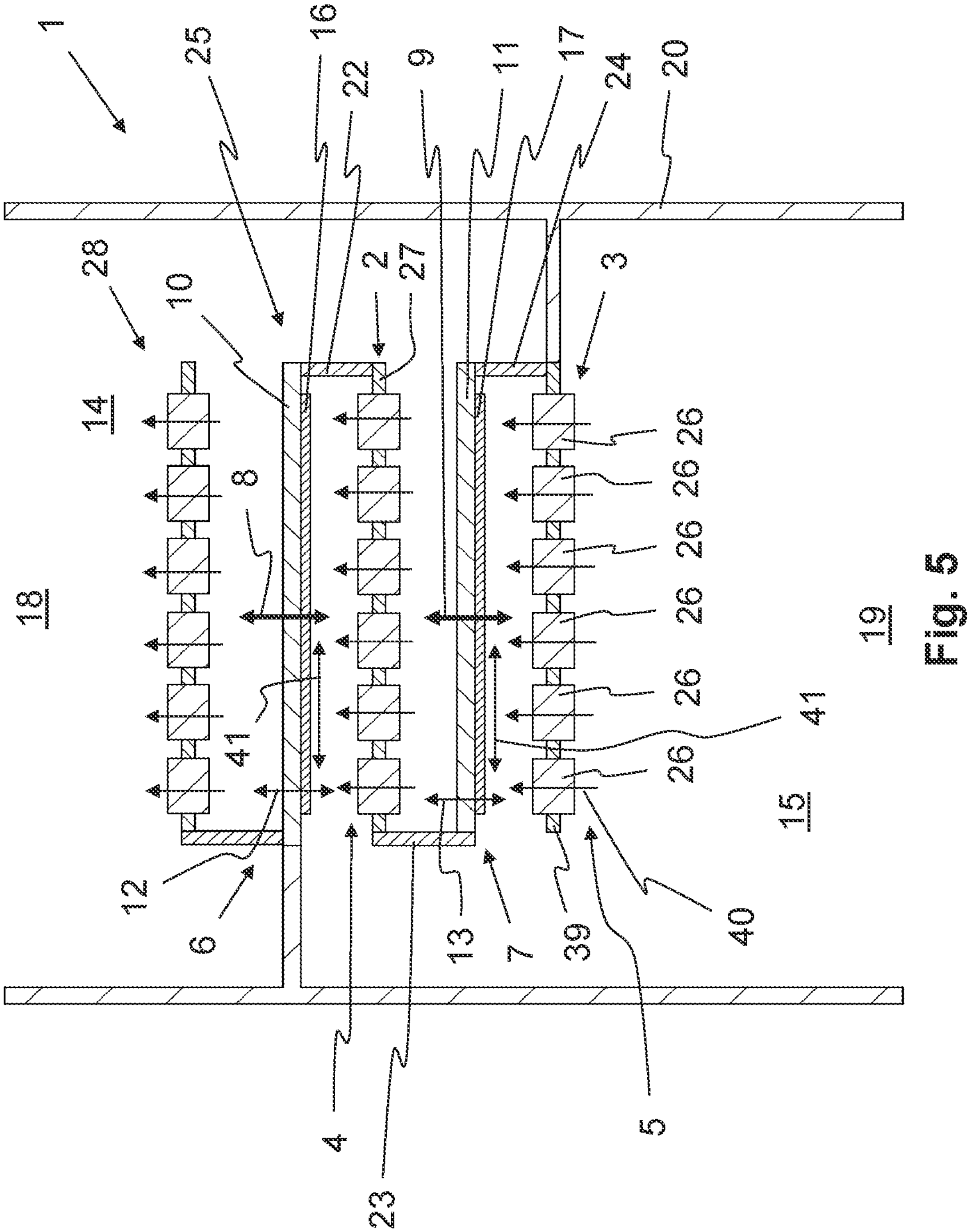
FIG. 5 shows a cross-section of a schematic view of a sound transducer unit having acoustic units and magnet units arranged one above the other.

FIG. 5 shows a cross-section of the sound transducer unit 1 having three magnet units 2, 3, 28 and two acoustic units 6, 7. One magnet unit 2, 3, 28 is respectively arranged above and below each of the two acoustic units 6, 7 in the direction of the corresponding stroke axis 8, 9. As a result, the Lorentz force, with which the diaphragms 10, 11 can be deflected, can be increased.

As shown here, as in the other figures as well, the stroke axes 8, 9, 38 are directed in the direction of the front and/or the rear exit opening 18, 19.

However, the sound cannot directly reach the front and/or the rear exit opening 18, 19.

Figure 6:
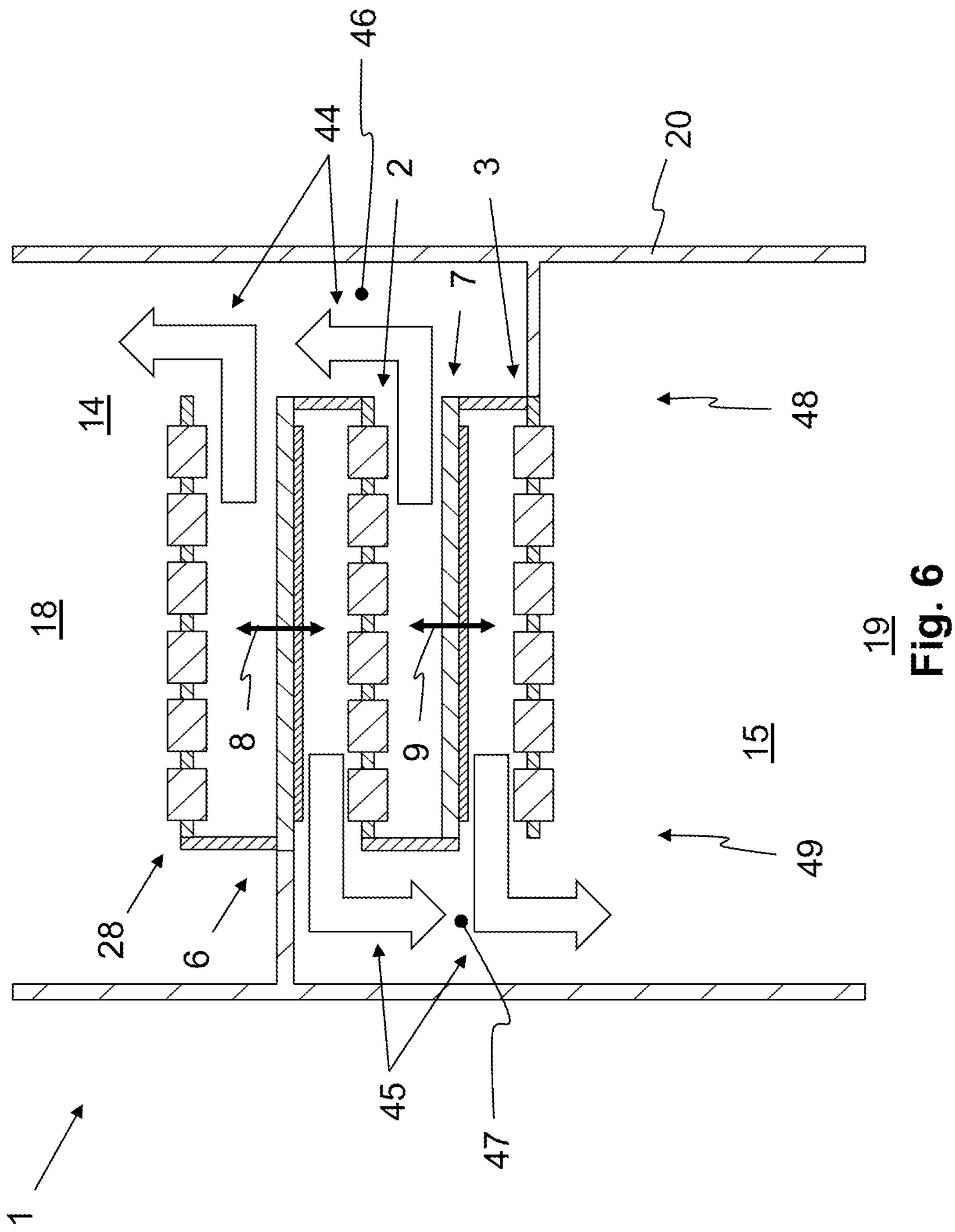
FIG. 6 shows a cross-section of a schematic view of sound conduction.

FIG. 6 shows a front volume sound conduction 44 in the front volume 14 and a back volume sound conduction 45 in the back volume 15. The front and the back volume sound conductions 44, 45, respectively, are characterized here by means of large arrows. The sound generated by the acoustic units 6, 7 is first emitted along the stroke axes 8, 9. Since the magnet units 2, 3, 28 are respectively arranged above and below these in the direction of the stroke axes 8, 9, the sound is deflected and/or redirected in the transverse direction, i.e., in the direction transversely to the stroke axes 8, 9. For this purpose, it is advantageous when the magnet units 2, 3, 28 are soundproof and/or sound-impermeable. Due to the housing 20, the sound is deflected or redirected again, now in the direction of the front and the rear exit openings 18, 19. Due to the arrangement of the acoustic units 6, 7, the magnet units 2, 3, 28 and/or the spacer elements 22, 23, 24, 32, 33, 43, and of the housing 20 shown in FIG. 6, the sound is redirected and/or deflected twice. The spacer elements 22, 23, 24, 32, 33, 43 are arranged such that the sound from the at least two acoustic units 6, 7 is superimposed. Additionally or alternatively, the spacer elements 22, 23, 24, 32, 33, 43 are arranged such that the sound from the at least two acoustic units 6, 7 is combined in the front volume 14 and/or in the back volume 15. Advantageously, the spacer elements 22, 23, 24, 32, 33, 43 are soundproof and/or sound-impermeable.

The front volume sound conduction 44 in the front volume 14 and a back volume sound conduction 45 in the back volume 15 are explained here only by means of two acoustic units 6, 7 and three magnet units 2, 3, 28. The sound can also be conducted for multiple acoustic units 6, 7 and magnet units 2, 3, 28, as shown in FIG. 6.

It is advantageous when the magnet units 2, 3, 28 and the acoustic units 6, 7 are arranged as in FIGS. 5 and 6. Specifically, it is advantageous when one magnet unit 2, 3, 28 is respectively arranged above and below each acoustic unit 6, 7 in the direction of the stroke axis 8, 9. In the present exemplary embodiments from FIGS. 5 and 6, this means, therefore, that the order in the direction of the stroke axes 8, 9 is magnet unit 2, 3, 28, acoustic unit 6, 7, magnet unit 2, 3, 28, acoustic unit 6, 7, magnet unit 2, 3, 28. As a result, each acoustic unit 6, 7 is, in particular directly, adjacent to two magnet units 2, 3, 28 and is arranged in their magnetic fields.

The sound conduction is described once again with reference to FIG. 6. The sound conduction described here can also be applied to the preceding figures.

Moreover, a first side region 48 and a second side region 49 are shown in FIG. 6. The side regions 48, 49 can also be referred to as lateral regions, in particular of the acoustic units 6, 7, 29 and/or of the magnet units 2, 3, 28.

As is shown in FIG. 6, a first conduction channel 46 and a second sound conduction channel 47 are arranged. The first sound conduction channel 46 is associated with the front volume 14 and the second sound conduction channel 47 is associated with the back volume 15.

By means of the sound conduction channels 46, 47, the sound waves can be conducted laterally past the acoustic units 6, 7, 29 and/or the magnet units 2, 3, 28. The sound conduction channels 46, 47 can, additionally or alternatively, combine the sound of the acoustic units 6, 7, 29. The first sound conduction channel 46 only combines the sound in the front volume 14 and the second sound conduction channel 47 combines the sound in the back volume 15.

The sound conduction channels 46, 47 can conduct the sound to the respective exit openings 18, 19. Furthermore, the sound conduction channels 46, 47 are bent, angled and/or curved. This is due to the fact that the sound conduction channels 46, 47 extend around the acoustic units 6, 7, 29 and/or the magnet units 2, 3, 28. In this case, the sound conduction channels 46, 47 are angled through 90°.

As is also shown in FIG. 6, both sound conduction channels 46, 47 have multiple inputs for sound and only one output for sound. This is also shown by means of the arrows of the front volume sound conduction 44 and the back volume sound conduction 45. This is due to the fact that the first sound conduction channel 46 combines and bundles the sound of the first and the second acoustic units 6, 7 in the front volume 14. The two acoustic units 6, 7 are the source. The sound conduction channel 46 has only one output, since the bundled sound is conducted to the front exit opening 18. The same applies for the second sound conduction channel 47. The difference is that the second sound conduction channel 47 conducts the sound, bundled, to the rear exit opening 19. Furthermore, the same applies when multiple acoustic units 6, 7, 29 are present, as in the preceding figures.

The two sound conduction channels 46, 47 can be described by means of the large arrows of the front volume sound conduction 44 and the back volume sound conduction 45.

Moreover, it is shown in FIG. 6 that, in one side region 48, 49, the region between one acoustic unit 6, 7, 29 and the magnet unit 2, 3, 28 arranged directly above or underneath is closed. This region is closed in this exemplary embodiment with a spacer element 22, 23, 24, 32, 33, 43. The opposite region in the other side region 48, 49 is open, however. As a result, the sound can exit only on the open side. Moreover, the closed regions and the open regions alternate in the side regions 48, 49 in the direction of the stroke axis 8, 9, 38.

The sound conduction channels 46, 47 are delimited by the housing 20 and the separating arrangement 25. In particular, the sound conduction channels 46, 47 are arranged between the housing 20 and the corresponding acoustic units 6, 7, 29 and/or magnet units 2, 3, 28 and/or spacer elements 22, 23, 24, 32, 33, 43 and/or are delimited thereby.

The sound can be amplified due to the sound conduction shown here.

The present subject matter is not limited to the exemplary embodiments shown and described. Variations within the scope of the patent claims are possible, as is a combination of the features, even if these are shown and described in different exemplary embodiments.

LIST OF REFERENCE CHARACTERS

1 sound transducer unit
2 first magnet unit
3 second magnet unit
4 first permanent magnetic field
5 second permanent magnetic field
6 first acoustic unit
7 second acoustic unit
8 first stroke axis
9 second stroke axis
10 first diaphragm
11 second diaphragm
12 first dynamic magnetic field
13 second dynamic magnetic field
14 front volume
15 back volume
16 first coil arrangement
17 second coil arrangement
18 front exit opening

19 rear exit opening
20 housing
21 control unit
22 first spacer element
23 second spacer element
24 third spacer element
25 separating arrangement
26 magnet element
27 first circuit board
28 third magnet unit
29 third acoustic unit
30 third diaphragm
31 third coil arrangement
32 fourth spacer element
33 fifth spacer element
34 third permanent magnetic field
35 third dynamic magnetic field
36 frame
37 electrical conductor
38 third stroke axis
39 second circuit board
40 magnetization direction
41 transverse component of the magnetic field
42 third circuit board
43 sixth spacer element
44 front volume sound conduction
45 back volume sound conduction
46 first sound conduction channel
47 second sound conduction channel
48 first side region
49 second side region

The invention claimed is:

1. A sound transducer unit, comprising:

at least two magnet units having a permanent magnetic field;

at least two acoustic units arranged in the permanent magnetic field, each of the at least two acoustic units including a diaphragm that is deflectable along a stroke axis for generating sound waves; and a coil arrangement provided in association each of the at least two acoustic units, the coil arrangement configured to be supplied an electric current such that the diaphragm is deflectable along the stroke axis;

wherein the at least two magnet units and the at least two acoustic units are arranged alternatingly one above the other, wherein the sound transducer unit has a front volume and a back volume, wherein the sound transducer unit includes a separating arrangement that separates the front volume and the back volume from one another, and wherein the separating arrangement and/or a housing of the sound transducer element is/are arranged such that sound from the at least two acoustic units can be combined in the front volume and/or in the back volume.

2. The sound transducer unit of claim 1, wherein the at least two acoustic units and the at least two magnet units are arranged one above the other in a direction of the stroke axis.

3. The sound transducer unit of claim 1, wherein the at least two magnet units and the at least two acoustic units are arranged congruently at least in some areas.

4. The sound transducer unit of claim 1, wherein first and second acoustic units of the at least two acoustic units are arranged in the permanent magnetic field of a first magnet unit of the at least two magnet units, wherein the first magnet unit is arranged between the first and second acoustic units in a direction of the stroke axis.

5. The sound transducer unit of claim 1, wherein the at least two acoustic units comprises at least three acoustic units and the at least two magnet units comprises at least three magnet units, the at least three acoustic units and the at least three magnet units being arranged alternatingly one above the other.

6. The sound transducer unit of claim 1, wherein one magnet unit of the at least two magnet units is respectively arranged above and below each of the at least two acoustic units in a direction of the stroke axis of each of the at least two acoustic units.

7. The sound transducer unit of claim 1, wherein the at least two acoustic units can emit the sound waves into the front volume and into the back volume.

8. The sound transducer unit of claim 1, wherein the diaphragm can deflect in the direction of the front volume and in the direction of the back volume.

9. The sound transducer unit of claim 1, wherein the sound transducer unit has a front exit opening through which the sound waves can exit the front volume and the sound transducer unit; and/or the sound transducer unit has a rear exit opening through which the sound waves can exit the back volume and the sound transducer unit.

10. The sound transducer unit of claim 9, wherein the at least two acoustic units can emit the sound waves in the direction of the front exit opening and/or in the direction of the rear exit opening.

11. The sound transducer unit of claim 1, wherein the separating arrangement includes the at least two acoustic units and the at least two magnet units.

12. The sound transducer unit of claim 1, wherein the separating arrangement, the housing, the at least two acoustic units, and/or the at least two magnet units are arranged such that the sound emitted from the at least two acoustic units is initially redirected transversely to the stroke axis and is subsequently redirected such that the sound once again extends in the direction along the stroke axis.

13. The sound transducer unit of claim 1, wherein the separating arrangement, the housing, the at least two acoustic units, and/or the at least two magnet units are arranged such that the sound emitted from the at least two acoustic units can be conducted around the at least two magnet units.

14. The sound transducer unit of claim 1, wherein a first side region between a first acoustic unit of the at least two acoustic units and a first magnet unit of the at least two magnet units arranged directly above or underneath the first acoustic unit in a direction of the stroke axis is closed via a spacer element of the sound transducer unit, and wherein a corresponding opposite second side region transverse to the stroke axis is open, wherein positions of the first and second side regions between the acoustic units and the magnet units alternate in the direction of the stroke axis.

15. The sound transducer unit of claim 1, wherein the sound transducer unit includes a first sound conduction channel and a second sound conduction channel that can combine sound from the at least two acoustic units and/or conduct the sound from the at least two acoustic units laterally past the at least two acoustic units and/or the at least two magnet units, wherein the first sound conduction channel is associated with a front volume of the sound transducer unit and the second sound conduction channel is associated with a back volume of the sound transducer unit.

16. The sound transducer unit of claim 1, wherein the coil arrangement is arranged on and/or in the diaphragm.

17. The sound transducer unit of claim 1, wherein the sound transducer unit includes a control unit for controlling at least one of the at least two acoustic units.

18. The sound transducer unit of claim 17, wherein the control unit can actuate the at least two acoustic units such that the respective diaphragms of the at least two acoustic units deflect synchronously in a direction of a front volume of the sound transducer unit and in a direction of a back volume of the sound transducer unit.

19. A method for operating a sound transducer unit, the sound transducer unit including at least two magnet units having a permanent magnetic field and at least two acoustic units arranged in the permanent magnetic field, each of the at least two acoustic units including a diaphragm that is deflectable along a stroke axis for generating sound waves, the sound transducer unit further including a coil arrangement provided in association each of the at least two acoustic units, the coil arrangement configured to be supplied an electric current such that the diaphragm is deflectable along the stroke axis, the at least two magnet units and the at least two acoustic units being arranged alternatingly one above the other, wherein the sound transducer unit has a front volume and a back volume, wherein the sound transducer unit includes a separating arrangement that separates the front volume and the back volume from one another, and wherein the separating arrangement and/or a housing of the sound transducer element is/are arranged such that sound from the at least two acoustic units can be combined in the front volume and/or in the back volume, the method comprising:

operating the at least two acoustic units in synchronization with one another.

20. The method of claim 19, wherein a first magnet unit of the at least two magnet units is arranged directly between first and second acoustic units of the at least two acoustic units, wherein operating the at least two acoustic units in synchronization with one another comprises operating the first and second acoustic units such that the diaphragms of the first and second acoustic units deflect in a same direction along their respective stroke axes.

* * * * *